(12) United States Patent
Rakshit et al.

(10) Patent No.: US 11,178,468 B2
(45) Date of Patent: Nov. 16, 2021

(54) ADJUSTMENTS TO VIDEO PLAYING ON A COMPUTER

(71) Applicant: INTERNATIONAL BUSINESS MACHINES CORPORATION, Armonk, NY (US)

(72) Inventors: Sarbajit K. Rakshit, Kolkata (IN); James E. Bostick, Cedar Park, TX (US); John M. Ganci, Jr., Raleigh, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,916

(22) Filed: Nov. 29, 2018

(65) Prior Publication Data

US 2020/0177967 A1    Jun. 4, 2020

(51) Int. Cl.
| | |
|---|---|
| *H04N 7/173* | (2011.01) |
| *H04N 21/6587* | (2011.01) |
| *H04N 21/439* | (2011.01) |
| *G06K 9/00* | (2006.01) |
| *H04N 21/45* | (2011.01) |
| *H04N 21/485* | (2011.01) |

(52) U.S. Cl.
CPC ..... *H04N 21/6587* (2013.01); *G06K 9/00288* (2013.01); *H04N 21/4396* (2013.01); *H04N 21/4524* (2013.01); *H04N 21/4852* (2013.01)

(58) Field of Classification Search
CPC ........... H04N 21/4333; H04N 21/6587; H04N 21/4396; H04N 21/4524; H04N 21/4852; G06K 9/00288
See application file for complete search history.

(56) References Cited

U.S. PATENT DOCUMENTS

| | | | |
|---|---|---|---|
| 9,324,322 B1 | 4/2016 | Torok et al. | |
| 10,178,222 B1* | 1/2019 | Knas | H04W 4/025 |
| 2009/0138507 A1 | 5/2009 | Burckart et al. | |
| 2010/0079508 A1* | 4/2010 | Hodge | G06F 1/3265 |
| | | | 345/697 |
| 2011/0196519 A1 | 8/2011 | Khoury et al. | |
| 2012/0060176 A1* | 3/2012 | Chai | H04H 60/45 |
| | | | 725/10 |
| 2014/0359443 A1* | 12/2014 | Hwang | G06F 3/0485 |
| | | | 715/716 |
| 2015/0070516 A1* | 3/2015 | Shoemake | H04N 21/44008 |
| | | | 348/207.11 |

(Continued)

*Primary Examiner* — Gigi L Dubasky
(74) *Attorney, Agent, or Firm* — Tutunjian & Bitetto, P.C.; Michael A. Petrocelli

(57) ABSTRACT

Adjusting a video playing on a computer, which can begin with opening a multimedia file on a multimedia application. The multimedia file to be displayed on a graphic user interface of a screen of a computing device. A method and system may further include detecting with a video play supervisor a pause signal, the pause signal selected from the group consisting of a computing environment signal indicating that a window is opened on the graphic user interface overlying the running display of the video component, an external environment factor signal; and a change in audience signal. The video play supervisor may send a pause command from the video play supervisor to the multimedia application to suspend broadcast of the multi-media file.

17 Claims, 4 Drawing Sheets

(56) References Cited

U.S. PATENT DOCUMENTS

| | | | |
|---|---|---|---|
| 2015/0370323 A1* | 12/2015 | Cieplinski | G06F 3/013 |
| | | | 345/156 |
| 2016/0018959 A1* | 1/2016 | Yamashita | G06F 3/0484 |
| | | | 715/716 |
| 2016/0080510 A1* | 3/2016 | Dawoud Shenouda Dawoud | H04N 21/4223 |
| | | | 709/225 |
| 2017/0313426 A1* | 11/2017 | Morin | H04W 4/33 |
| 2017/0359626 A1 | 12/2017 | Chen et al. | |
| 2020/0097500 A1* | 3/2020 | Breaux | G06F 16/686 |
| 2020/0120384 A1* | 4/2020 | Armaly | H04N 21/4532 |

* cited by examiner

ADJUSTMENTS TO VIDEO PLAYING ON A COMPUTER

BACKGROUND

Technical Field

The present invention generally relates to video content, and more particularly to automatically pausing video content.

Description of the Related Art

The presence of video applications on computer devices has grown considerably in the recent past resulting in widespread usage. Users of video applications on computer devices can have multiple applications running on the same computer. Starting and stopping video applications when switching to other applications running on the same computer can cause the user of the computer some difficulty. It can be difficult to start and stop video applications with reproducible results so that the user can start up where they left off when they want to switch back to the video application. Additionally, in some instances, the user may wish for the audio for the video application to continue on the computer, when the user of the device has switched from a video application to another application that is running on the same computer.

SUMMARY

In accordance with an embodiment of the present invention, a method for making adjustments to a video playing apparatus is provided. In one embodiment, the method may be a computer implemented method for making adjustments to a video playing apparatus, which can begin with opening a multimedia file on a multimedia application, the multimedia file to be displayed on a graphic user interface of a screen of a computing device, wherein opening the multimedia file starts at least one of a running display of a video component of the multi-media file and broadcast of an audio component of the multi-media file. The method may further include detecting with a video play supervisor a pause signal, the pause signal selected from the group consisting of a computing environment signal indicating that a window is opened on the graphic user interface overlying the running display of the video component, an external environment factor signal; and a change in audience signal. The video play supervisor may send a pause command from the video play supervisor to the multimedia application to suspend at least one of said running the display of the video component of the multi-media file and the broadcast of the audio component of the multi-media file.

In another aspect, a system is provided for supervising the play of a video on a computing device. In one embodiment, the video play system may include a computing device including a screen with a graphic user interface; and a multimedia application run by the computing device for running a multimedia file. Running the multimedia file includes displaying a video component of the multimedia file on the graphic user interface of the screen and a broadcast of an audio component of the multimedia file. The system may further include a video play supervisor for sending a pause command to the multimedia application to suspend at least one of said running the display of the video component of the multimedia file and the broadcast of the audio component of the multi-media file, the pause command being sent in response to the receipt by the video play supervisor of a pause signal. The pause signal selected from the group consisting of a computing environment signal indicating that a window is opened on the graphic user interface of the computing device is overlying the running display of the video component, an external environment factor signal; and a change in audience signal.

In another aspect, the present disclosure provides a computer program product comprising a non-transitory computer readable storage medium having computer readable program code embodied therein for making adjustments to a video playing apparatus. The method actuated by the computer program product may include opening a multimedia file on a multimedia application, the multimedia file to be displayed on a graphic user interface of a screen of a computing device, wherein opening the multimedia file starts at least one of a running display of a video component of the multi-media file and broadcast of an audio component of the multi-media file; and detecting with a video play supervisor a pause signal, the pause signal selected from the group consisting of a computing environment signal indicating that a window is opened on the graphic user interface overlying the running display of the video component, an external environment factor signal; and a change in audience signal. The method may further include sending a pause command from video play supervisor to the multimedia application to suspend at least one of said running the display of the video component of the multi-media file and said broadcast of the audio component of the multi-media file.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
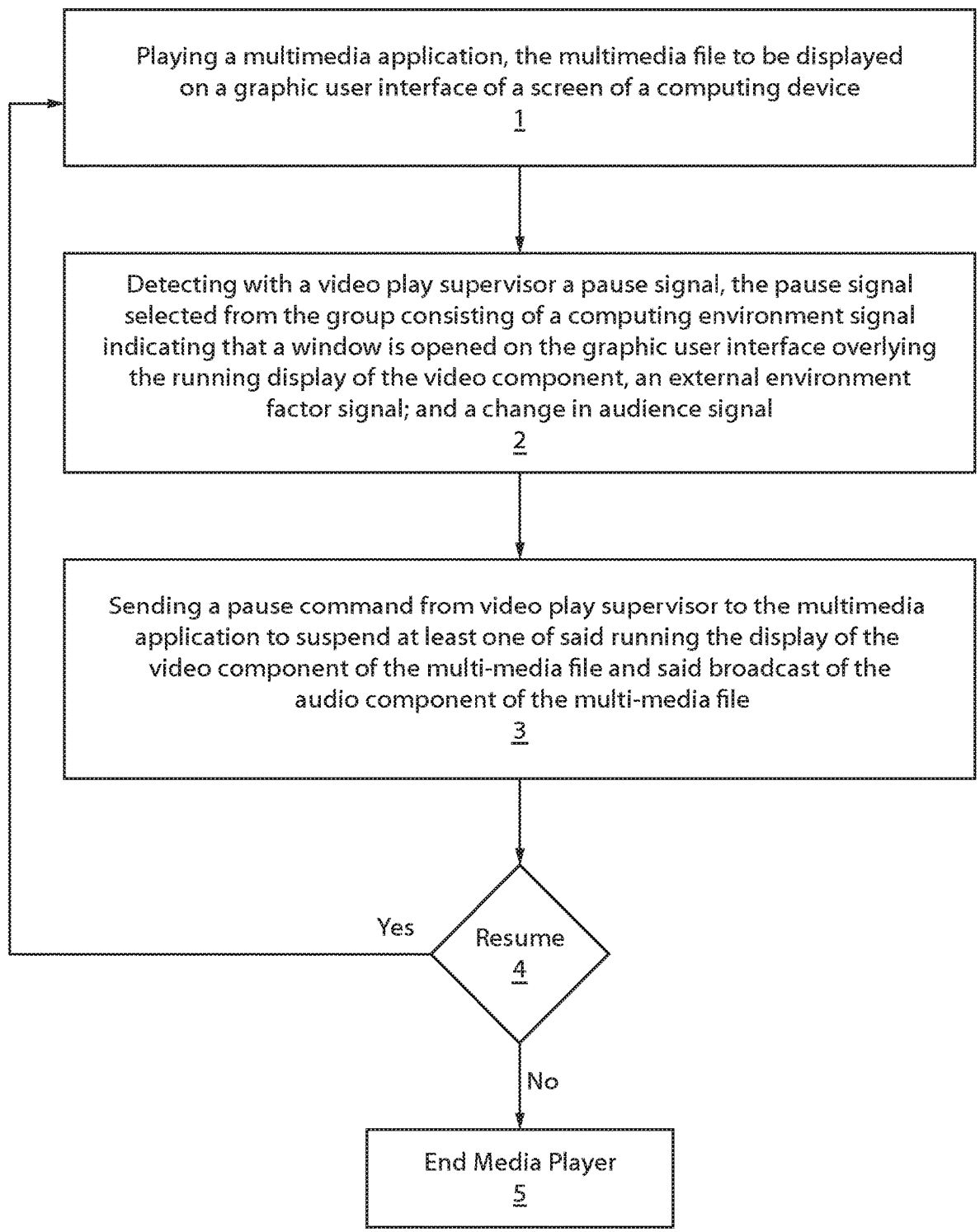
FIG. 1 is a block/flow diagram showing a system/method for contextual systematic adjustments top video playing apparatus, in accordance with an embodiment of the present invention.

In some embodiments, the disclosure provides a granular method and apparatus for programmed applications, windows and operating systems to control a video playing application or site so that videos are automatically paused restarted. The methods and systems of the present disclosure are providing greater control of video playing applications and video playing websites than previously provided. The systems, methods and computer program products that are described herein have the ability to decide when to pause and restart automatically. The systems, methods and computer program products that are described herein can also decide when to only play the audio portion of a video. In some embodiments, the systems, methods, and computer program products can also decide to mute or play audio. In some embodiments, the systems, methods, and computer program products decide when to play just the audio portion of a video and forego the video. In some embodiments, the systems, methods, and computer program products can decide when to close or hide a video. In some embodiments, the systems, methods, and computer program products want these systematic decisions to be based on what else is happening within a device (other apps, interruptions), what activities are taking place outside of the device (user is driving or just sitting around) and based on who the system perceives to be around.

In some embodiments, the methods, systems and computer program products of the present disclosure provide that a video site, such as YouTube™, or other video rendering application, will be instructed to pause, close, mute or take some other action based on systematic determination of events. For example, in one aspect, a video may be paused upon systematic detection that the browser/application/window it is running in has been overlaid by another recently opened application or window. In another aspect, the configuration may allow for audio continuation even when the video cannot be seen. This capability could be decided on a granular level so that videos of some genres, such as music videos, may allow for the audio to continue being broadcast while videos of other genres, such as movies, would behave differently. The system also have the ability to detect activity outside of the realm of the computerized device. Other paired devices may be able to determine a current activity such as driving in our example. Systematic decisioning would allow for the audio to continue while stopping the video.

In one aspect, the methods, systems and computer program products allow for the detection of others in the vicinity of the device which triggers a systematic reaction to automatically lower volume, pause the video, or even close the video, while bookmarking the restart location. In some embodiments, we provide a learning method where certain people could be recognized through image analysis where the system would behave differently based on who that person was. Applications can be provided with capability to send and receive commands as warranted by the system such that an application such as Instant messaging may be told to pause interruption for a configurable period, or, in the reverse, it might tell the video player to pause. The concepts described herein aim to provide a deeper contextual awareness for more accurate triggering of stopping/starting a video or aspects of a video.

As one embodiment, the configuration would allow a user to allow the audio to continue even when the video cannot be seen (as opposed to the configured choice for pausing the video).

In some embodiments, the methods, systems and computer program products can detect user activity outside of the realm of the computerized device. So, we may detect an activity such as driving and make a systematic decision to render only the audio portion of a conference call and to end the video portion which would be taking up bandwidth needlessly.

Multiple applications can communication with a video playing device or site through standard API to control it in such a way that multiple applications such as instant messaging may have a configurable control over video playing, The detection of others near the device which triggers a systematic reaction to automatically lower volume, pause the video, or even close the video, while bookmarking the restart location.

In some embodiments, a learning method can be provided where certain people could be recognized through image analysis where the system would behave differently based on who that person was.

The systems, methods and computer program products are now described with more detail with reference to FIGS. 1-4.

FIG. 1 is a block/flow diagram showing a system/method for contextual systematic adjustments top video playing apparatus.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, the method may begin at block 1, which can include opening a multimedia file on a multimedia application, the multimedia file to be displayed on a graphic user interface of a screen of a computing device. The computing device suitable for use with the present disclosure includes any computing device, such as a desktop PC computer, a laptop, a mobile electronic computing device, a tablet computing device, The multimedia application may be any application that can play video and/or audio. In some examples, the multimedia application may play video media having the following formats: MP4 (mp4, m4a, m4v, f4v, f4a, m4b, m4r, f4b, mov), 3GP (3gp, 3gp2, 3g2, 3gpp 3gpp2), OGG (ogg, oga, ogv, ogx), WMV (wmv, wma, asf), WEBM (webm), FLV (fly), AVI, QuickTime, HDV, MXF (OP1a, OP-Atom), MPEG-TS (ts), MPEG-2 PS, MPEG-2 TS, WAV, Broadcast WAV, LXF, GXF, VOB and combinations thereof. Audio formats that can be played by the multimedia application can include MP3, AAC, HE-AAC, AC3 (Dolby Digital), EAC3 (Dolby Digital Plus), Vorbis, WMA, PCM and combinations thereof. It is noted that the aforementioned media types are provided for illustrative purposes only, and are not intended to limit the present disclosure. Any video media may be equally applicable to the methods, systems and computer program products of the present disclosure.

Still referring to block 1 of FIG. 1, opening the multimedia file can starts at least one of a running display of a video component of the multi-media file and broadcast of an audio component of the multi-media file.

At block 2 of FIG. 1, a video play supervisor 75 can detect a pause signal. The pause signal can be a computing environment signal indicating that a window is opened on the graphic user interface overlying the running display of the video component. In some embodiments, while a device, or even video sites, such as YouTube, is rendering a video, such videos would be automatically paused upon detection that another application or window is on top of the video rendering window or application. This is only one example of a pause signal.

Another type of pause signal is the external environment factor signal. This type of factor is not something running on the same computer, such as an application. An external environmental factor may be a type of temperature or a degree of sunlight. An external environmental factor could be movement of the computing device. This can be measures by GPS systems, which can be integrated into the computing device. The GPS measures motion of the computing device, wherein in response to the motion of the computing device the pause signal is sent to the video play supervisor. In one example, the computing device including the GPS is mounted to a motor vehicle. In this example, when the car starts movie, the pause signal as an external environmental factor signal could signal at least one of the video or audio media to be paused until the motor vehicle comes to a stop.

Another type of pause signal is a change of audience signal. The methods, system and computer products allow for the detection of others near the device which triggers a systematic reaction to automatically lower volume, pause the video, or even close the video, while bookmarking the restart location. In some embodiments, we provide a learning method where certain people could be recognized through image analysis where the system would behave differently based on who that person was. This information can all be used in a pause signal.

Referring to block 3 of FIG. 1, the method may continue with sending a pause command from video play supervisor to the multimedia application to suspend at least one of said running the display of the video component of the multimedia file and said broadcast of the audio component of the multi-media file. In some embodiments, the pause command suspends both the display of the video component and the broadcast of the audio component of the multi-media file. In some other embodiments, the pause command suspends the display of the video component, wherein the broadcast of the audio component of the multi-media file continues. In yet other embodiments, the pause command suspends the audio component of the multi-media file, wherein the display of the video component continues. In one example, the configuration would allow a user to allow the audio to continue even when the video cannot be seen (as opposed to the configured choice for pausing the video). This is done on a granular level so that videos of some genres, e.g., music videos, may have a different configuration than other genres, e.g., movies.

At this point, some element of the media is paused. Referring to block 4, a user can decide to resume broadcasting the media, or the user could discontinue the use of the media player. If the user resumes the broadcast, the system can loop back to block 1, in which the system plays the multimedia, and waits from another pause signal at block 2.

Figure 2:
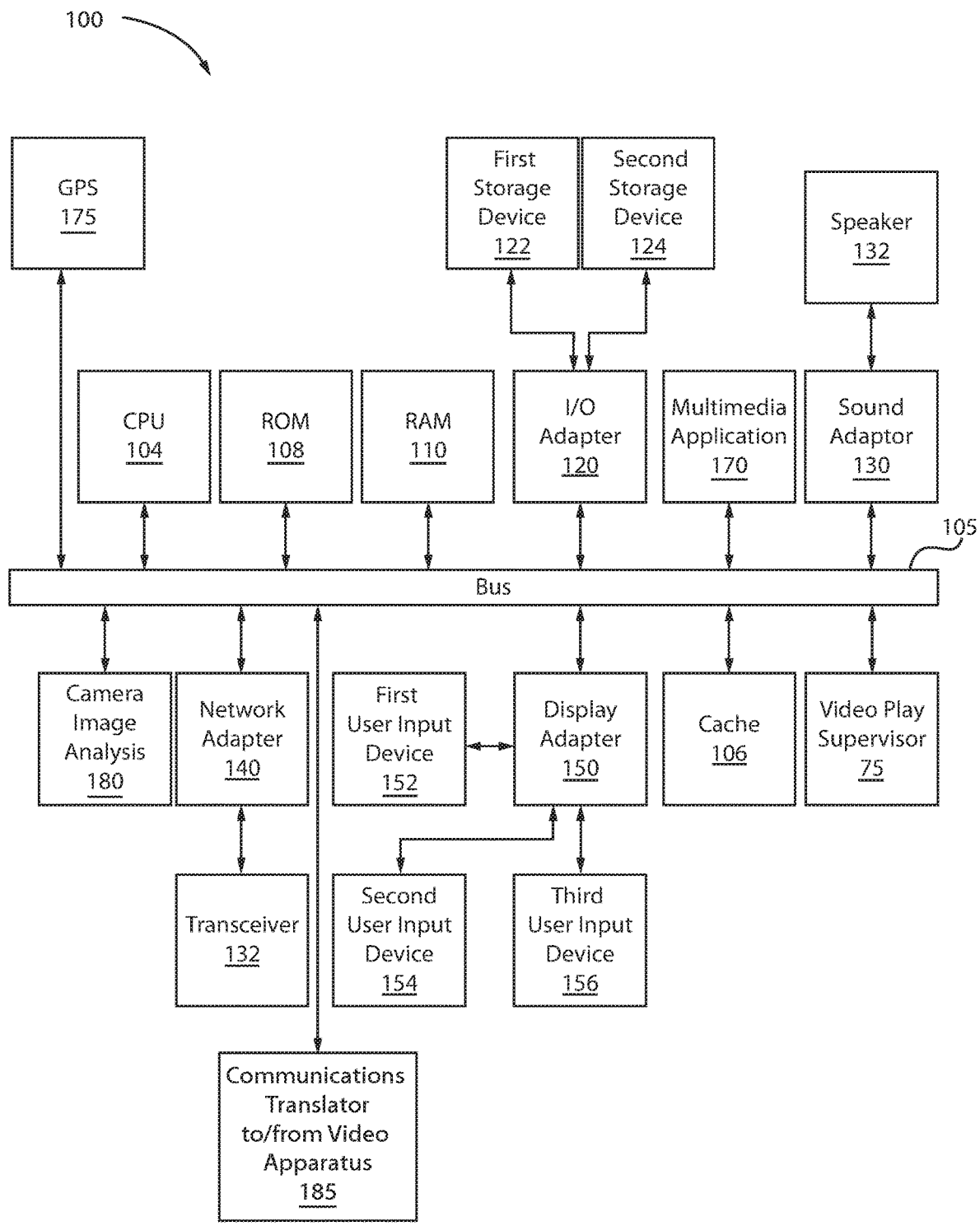
FIG. 2 is a block diagram illustrating a system for contextual systematic adjustments top video playing apparatus, in accordance with one embodiment of the present disclosure.

FIG. 2 is a block diagram illustrating a system 100 for contextual systematic adjustments top video playing apparatus, which can be used to practice the method depicted in FIG. 1. The processing system 100 includes at least one processor (CPU) 104 operatively coupled to other components via a system bus 105. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 105. The bus 105 interconnects a plurality of components has will be described herein.

In one embodiment, the system for supervising the play of a video includes a computing device (CPU 102, ROM 108, RAM 110) including a screen (display device 162) with a graphic user interface (display adapter 160). The system 100 further includes a multimedia application 170 run by the computing device for running a multimedia file, wherein running the multimedia file includes displaying a video component of the multimedia file on the graphic user interface of the screen 162 and a broadcast of an audio component (speaker 132) of the multimedia file.

Still referring to FIG. 2, the system further includes a video player supervisor 75 for sending a pause command to the multimedia application 170 to suspend at least one of said running the display of the video component of the multimedia file and the broadcast of the audio component of the multi-media file.

The pause command being sent in response to a receipt by the video play supervisor of a pause signal selected from the group consisting of a computing environment signal indicating that a window is opened on the graphic user interface of the computing device and is overlying the running display of the video component, an external environment factor signal; and a change in audience signal. The pause signal may be received may a transceiver 142, which is in communication to the video play supervisor 75 through a bus having reference number 105.

The system 100 may further include a GPS system 170. GPS enabled devices could find the exact location of the user. Associated mapping software such google maps as one example could understand the location and pinpoint that location to a roadway, to a park, to a movie theatre, office building etc. Knowing the type of location that the user is in may affect the way the user wishes the system to respond, e.g., to pause video, audio or a combination of video and audio.

The system may further include cameras and image analysis hardware. As an enabler, image analysis could be used by the system 100 to "see" who is around and systematically apply rules to limit audio, stop/pause video, as signaled by a change of audience signal in block 2 of the method described in FIG. 1.

In some embodiments, the system 100 depicted in FIG. 2 can further include communications translator to/from video players 185. The system may need to talk to video players to pause them. Likewise, they would use API to pause a video playing on a site such as YouTube. Additional commands could include to minimize or close the window from which these are rendered in some cases.

In some embodiments, the system includes mapping devices 164 for mapping of the screen, e.g., mapping of the GUI of the screen, to known when one window covers another. This way, the system 100 can know to send a command to pause video playing in the background, or to play the audio only, or to continue it (as configured for this trigger). This is an example of a computing environment signal indicating that a window is opened on the graphic user interface overlying the running display of the video component, as described in block 2 of FIG. 1

The system 100 depicted in FIG. 2, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

For the methods and systems described with reference to FIGS. 1 and 2, the user will have choices starting with whether the capability is toggled on or off. The capability for image analysis to see what is happening around the user can be configurable. Choices can be made for different genres of video's. For example, music videos may be configured to play sound even with the user unable to pay attention or not paying attention to the video aspect. Movies or TV shows may be configured to pause when the user is not paying attention. The audio aspect of video conferences may be configured to continue while the video portion is disabled when driving or certain other activities. Those are three simple examples of many possibilities.

In some embodiments, the user will be able to configure paired devices through which information can be provided for activity detection or other. The capability to use location of the user along with the mapping capability to know the type of place a user is at could be configured to configure action at a granular level, thus configuring multiple locations at a granular level. Here is one example: a user is playing a video with audio (or just audio) while walking into a library. This could trigger a systematic reaction to automatically mute the sound or bring it down to a level 2 or some low level automatically (while the video aspect can continue playing if desired).

A video player can be an app or application running on a computer or device for playing videos. These are set up to take systematic commands based on user key or button selection. A video player may also be software running in a browser for playing videos (e.g. YouTube). These take commands and systematic direction from the browser they run in based on keystrokes and button selection within the browser; a possible extra layer. Contextually, there are reasons a video/audio might be stopped or paused.

Cameras, eye gaze and image analysis can be used to determine that a user has looked away from the camera. In one embodiment, based on this alone, a video pause action might be issued.

When a user opens a second app on a device, or overlays a browser where video is playing with another window, a video pause action might be issued. This particular step is accomplished using the mappings of the screen where the operating system or device already knows the size and placement of window one, and can tell when a user has overlaid window 1 with another app or window.

In some embodiments, when device 1 (watch) communicates with device 2 that a certain activity is starting, a video pause action might be issued.

In yet another example, if proximity sensors, combined with GPS capability determines that a user is sitting in the driver position of a moving vehicle, a video pause/stop command may be issued. If so configured, a video may be commanded to stop while the audio continues. The use case for this may be a music video or web conference call.

In an even further example, if GPS and mapping determines that a user is in a specific type of building, a video stop or audio mute command may be issued. In other examples an audio volume setting command may be issued to place the audio on a very low volume. For example, the audio portion should be quieted when entering a library.

Cameras that are set up to look at surroundings and determine if others are around may be invoked to check. For example, a user may be working on a personal issue while at work and viewing a video on how to handle moving a loved one to assisted living. Perhaps the system is configured to notice others around and automatically pause the video or STOP the video all together, including closing a browser. A restart command is another possibility when any of the above scenarios are reversed.

If microphones are used in an embodiment, surrounding ambient noise can be picked up and queue the system to pause while the distraction is continued and to restart when the distraction is over. Like the other options, this can be over-rideable.

In another embodiment, a topic of conversation may be ascertained through NLP classification techniques and if it matches something of importance to the user (previously tracked through a knowledge-base), then the video may pause to allow the user to jump in to the conversation. Otherwise, if the classified conversation is not on a topic of interest to the user, then the video could continue. In fact, the system could in this case queue the playing device to increase the volume.

In one embodiment, a marker may be placed at the point in the video where the user has lost focus and a replay action can be initiated (if so configured) from that point.

The system may have decided that a specific action should be taken in the determination section. So, at this point, the system may have decided on any number of actions such as pause, stop, close, close browser, restart, stop video only, stop audio, change audio setting. All of these functions will be associated to a standardized list of codes for all software to understand.

There can be a standardized communication vehicle between software and devices for this purpose, consisting of necessary WSDL's and Schemas for service calls between configured software and standardized API for sending across the necessary codes representing the functions necessary.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product comprising a non-transitory computer readable storage medium having computer readable program code embodied therein for making adjustments to a video playing apparatus. The method actuated by the computer program product may include opening a multimedia file on a multimedia application, the multimedia file to be displayed on a graphic user interface of a screen of a computing device, wherein opening the multimedia file starts at least one of a running display of a video component of the multi-media file and broadcast of an audio component of the multi-media file; and detecting with a video play supervisor a pause signal, the pause signal selected from the group consisting of a computing environment signal indicating that a window is opened on the graphic user interface overlying the running display of the video component, an external environment factor signal; and a change in audience signal. The method may further include sending a pause command from video play supervisor to the multimedia application to suspend at least one of said running the display of the video component of the multi-media file and said broadcast of the audio component of the multi-media file.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
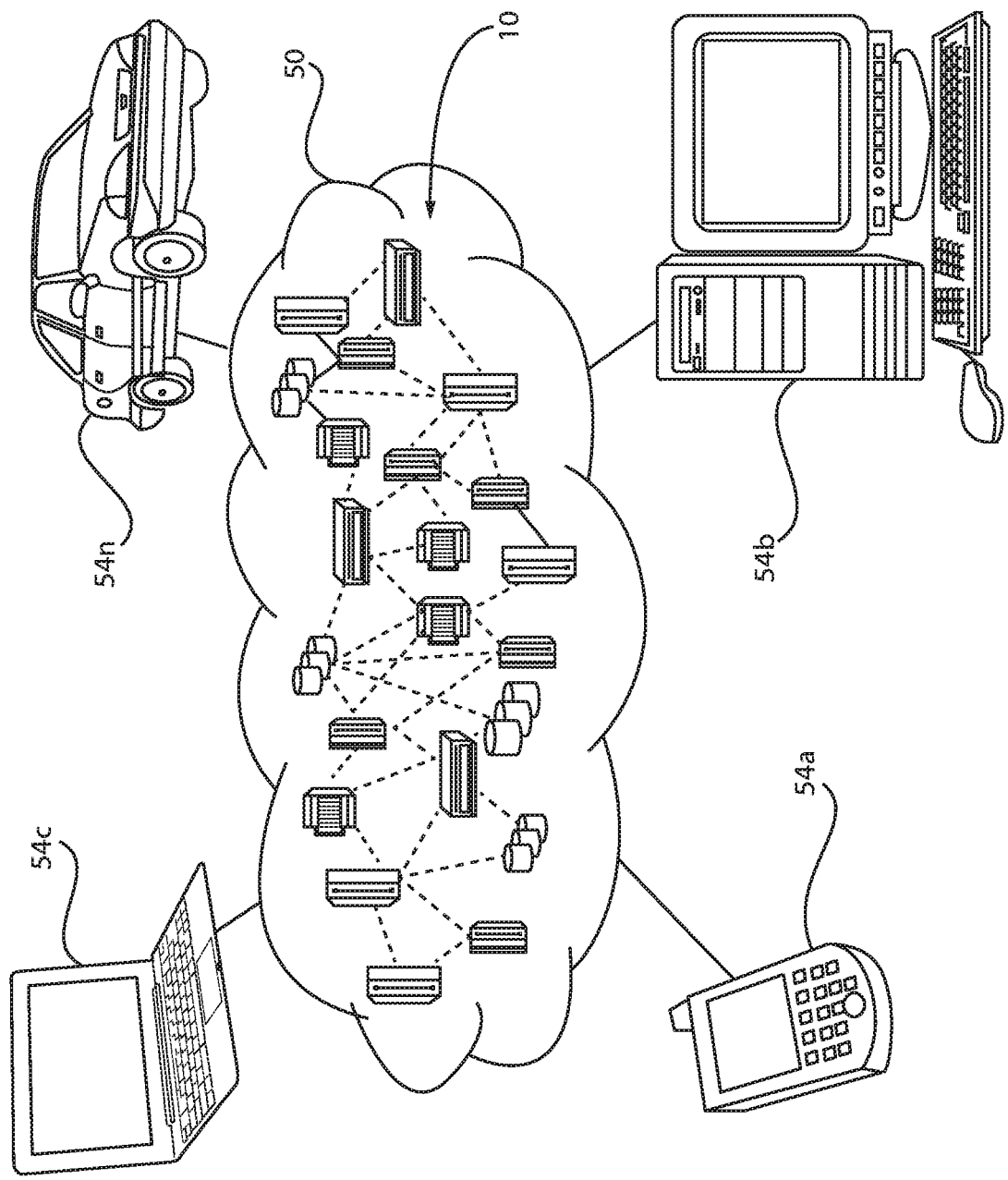
FIG. 3 depicts a cloud computing environment according to an embodiment of the present disclosure.

Referring now to FIG. 3, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 4:
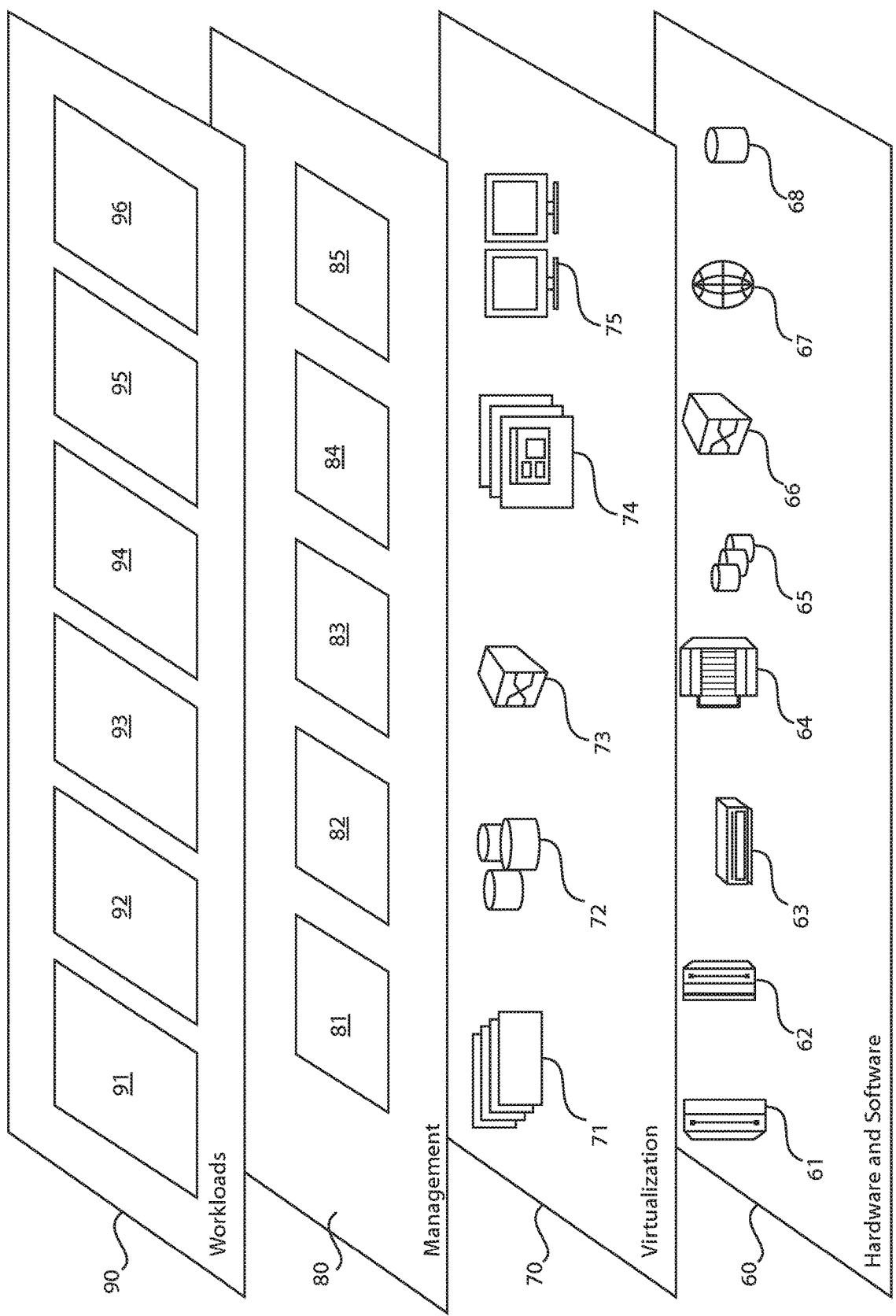
FIG. 4 depicts abstraction model layers according to an embodiment of the present disclosure.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for video play supervisor, which is described with reference to FIGS. 1-2.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a contextual systematic adjustments to video playing apparatus (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method for adjusting video playing on a computer comprising:
    opening a multimedia file on a multimedia application, the multimedia file to be displayed on a graphic user interface of a screen of a computing device, wherein opening the multimedia file starts at least one of a running display of a video component of the multimedia file and broadcast of an audio component of the multimedia file;
    detecting with eye gaze measurement of a user whether the user is watching the multimedia application, a first pause signal being triggered when the user is not watching the multimedia file;
    detecting with a video play supervisor a second pause signal, the second pause signal being triggered by a computing environment signal indicating that a window is opened on the graphic user interface overlying the running display of the video component of the multimedia file;
    detecting with the video play supervisor a third pause signal, the third pause signal being triggered by a topic of a conversation detected by natural language processing classification techniques in combination with a change in audience signal that indicates a presence of a person that is different from the user employing the computer implemented method for adjusting video playing on the computer, the topic of the conversation matches the user's interests being previously tracked through a knowledge base;
    bookmarking a restart location for at least one of said video component and said audio component; and
    sending a pause command from the video play supervisor to the multimedia application:
        to suspend at least one of said running the display of the video component of the multimedia file and said broadcast of the audio component of the multimedia file depending on a genre of multimedia file and in response to at least one of the first pause signal and the second pause signal, and
        to suspend both said running the display of the video component of the multimedia file and said broadcast of the audio component of the multimedia file in response to the third pause signal to allow the user engaging in the conversation,
    wherein when at least one of the user begins to watch the multimedia application and the presence of the person is removed the video play supervisor restarts the at least one of said running the display of the video component of the multimedia file and said broadcast of the audio component of the multimedia file at the restart location.

2. The computer implemented method of claim 1, wherein the pause command suspends the display of the video component, wherein the broadcast of the audio component of the multi-media file continues.

3. The computer implemented method of claim 1, wherein the pause command suspends the audio component of the multi-media file, wherein the display of the video component continues.

4. The computer implemented method of claim 1, further comprising an external environment factor signal indicates a change in location of said computing device measured by global positioning system.

5. The computer implemented method of claim 4, wherein the global positioning system measures motion of the computing device, wherein in response to the motion of the computing device the pause command from video play supervisor to the multimedia application suspends the running of the display of the video component of the multimedia file.

6. The computer implemented method of claim 5, wherein the computing device is mounted to a motor vehicle.

7. The computer implemented method of claim 1, wherein the change in audience signal indicates an identity of a person within visual range of the screen of the computing device, the identity of the person determined by facial recognition from images captured by cameras.

8. A system for supervising the play of a video comprising:
   a computing device including a screen with a graphic user interface;
   a multimedia application run by the computing device for running a multimedia file, wherein running the multimedia file includes displaying a video component of the multimedia file on the graphic user interface of the screen and a broadcast of an audio component of the multimedia file;
   a camera for detecting with eye gaze measurement of a user whether the user is watching the multimedia application; and
   a video player supervisor for sending a pause command to the multimedia application:
      to suspend at least one of said running the display of the video component of the multimedia file and the broadcast of the audio component of the multimedia file depending on a genre of multimedia file, the pause command being sent in response to at least one receipt by the video play supervisor of a first pause signal being triggered when the user is not watching the multimedia file and of a second pause signal being triggered by a computing environment signal indicating that a window is opened on the graphic user interface overlying the display of the video component of the multimedia file; and
      to suspend both said running the display of the video component of the multimedia file and the broadcast of the audio component of the multimedia file in response to the receipt of a third pause signal that indicates a topic of a conversation detected by natural language processing classification techniques in combination with a presence of a person that is different from the user employing the computer implemented method for adjusting video playing on the computer to allow the user engaging in the conversation, the topic of the conversation matches the user's interests being previously tracked through a knowledge base,
   wherein the video player supervisor also bookmarks a restart location for at least one of said video component and said audio component consistent with pause signals, the restart location for restarting the at least one of said running the display of the video component of the multimedia file and the broadcast of the audio component of the multimedia file at the restart location when the presence of the person is removed and the user begins to watch the multimedia application again after a period of the not watching of the multimedia application.

9. The system of claim 8, wherein the pause command suspends the display of the video component, wherein the broadcast of the audio component of the multi-media file continues.

10. The system of claim 9, wherein the pause command suspends the audio component of the multi-media file, wherein the display of the video component continues.

11. The system of claim 8, further comprising an external environment factor signal indicates a change in location of said computing device measured by global positioning system.

12. A computer program product comprising a non-transitory computer readable storage medium having computer readable program code embodied therein for making adjustments to a video playing apparatus, performing:
   opening a multimedia file on a multimedia application, the multimedia file to be displayed on a graphic user interface of a screen of a computing device, wherein opening the multimedia file starts at least one of a running display of a video component of the multimedia file and broadcast of an audio component of the multimedia file;
   detecting with eye gaze measurement of a user whether the user is watching the multimedia application, a first pause signal being triggered when the user is not watching the multimedia file;
   detecting with a video play supervisor a second pause signal, the second pause signal being triggered by a computing environment signal indicating that a window is opened on the graphic user interface overlying the running display of the video component of the multimedia file;
   detecting with the video play supervisor a third pause signal, the third pause signal being triggered by a topic of a conversation detected by natural language processing classification techniques in combination with a change in audience signal that indicates a presence of a person that is different from the user employing the computer implemented method for adjusting video playing on the computer, the topic of the conversation matches the user's interests being previously tracked through a knowledge base;
   bookmarking a restart location for at least one of said video component and said audio component; and
   sending a pause command from the video play supervisor to the multimedia application:
      to suspend at least one of said running the display of the video component of the multimedia file and said broadcast of the audio component of the multimedia file depending on a genre of multimedia file and in response to at least one of the first pause signal and the second pause signal, and
      to suspend both said running the display of the video component of the multimedia file and said broadcast of the audio component of the multimedia file in response to the third pause signal to allow the user engaging in the conversation,
   wherein when at least one of the user begins to watch the multimedia application and the presence of the person is removed the video play supervisor restarts the at least one of said running the display of the video component of the multimedia file and said broadcast of the audio component of the multimedia file at the restart location.

13. The computer program product of claim 12, wherein the pause command suspends the display of the video component, wherein the broadcast of the audio component of the multi-media file continues.

14. The computer program product of claim 12, wherein the pause command suspends the audio component of the multi-media file, wherein the display of the video component continues.

15. The computer program product of claim 12, further comprising an external environment factor signal indicates a change in location of said computing device measured by global positioning system.

16. The computer program product of claim 15, wherein the global positioning system measures motion of the computing device, wherein in response to the motion of the computing device the pause command from video play supervisor to the multimedia application suspends the running of the display of the video component of the multi-media file.

17. The computer program product of claim 12, wherein the change in audience signal indicates an identity of a person within visual range of the screen of the computing device, the identity of the person determined by facial recognition from images captured by cameras.

* * * * *